United States Patent
Berkovits

(10) Patent No.: US 7,099,998 B1
(45) Date of Patent: Aug. 29, 2006

(54) METHOD FOR REDUCING AN IMPORTANCE LEVEL OF A CACHE LINE

(75) Inventor: Ariel Berkovits, Yuvalim (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,839

(22) Filed: Mar. 31, 2000

(51) Int. Cl.
*G06F 12/12* (2006.01)

(52) U.S. Cl. .................. 711/134; 711/141; 711/136

(58) Field of Classification Search ........... 711/133, 711/136, 134
See application file for complete search history.

(56) References Cited

U.S. PATENT DOCUMENTS

| | | | | |
|---|---|---|---|---|
| 4,713,755 A * | 12/1987 | Worley, Jr. et al. | ............. | 707/4 |
| 5,398,325 A * | 3/1995 | Chang et al. | ................. | 711/3 |
| 5,594,886 A * | 1/1997 | Smith et al. | ................. | 711/118 |
| 5,715,427 A * | 2/1998 | Barrera et al. | ............. | 711/136 |
| 5,774,697 A * | 6/1998 | Hall | ........................... | 711/141 |
| 5,778,422 A * | 7/1998 | Genduso et al. | ............ | 711/117 |
| 5,778,432 A * | 7/1998 | Rubin et al. | ................ | 711/133 |
| 5,802,568 A * | 9/1998 | Csoppenszky | .............. | 711/108 |
| 6,314,561 B1 * | 11/2001 | Funk et al. | ................. | 711/137 |

OTHER PUBLICATIONS

Wu et al., "A Quantitative Evaluation of Cache Types for High-Performance Computer Systems", © 1993, IEEE, pp. 1154-1162.*
So et al., "Cache Operations by MRU Change", © 1988, IEEE, pp. 700-709.*
"Alpha Architecture Handbook", © 1996 Digital Equipment Corporation, p. 4-5-4-12 & 5-1-5-10.*
Cheong et al., "Compiler-Directed Cache Management in Multiprocessors", © 1990 IEEE, p. 39-47.*

* cited by examiner

*Primary Examiner*—Brian R. Peugh
(74) *Attorney, Agent, or Firm*—Kenyon & Kenyon LLP

(57) ABSTRACT

A method for reducing an importance level of a line in a memory of a cache. An instruction is provided to the cache, the instruction indicating that the line is a candidate for replacement. The importance level of the line may then be reduced based on the instruction. The method may increase cache hit rate and, hence, microprocessor performance.

38 Claims, 3 Drawing Sheets

| | Sequence | a | b | a | c | d | b | RICL (b) | e | a | c | d |
|---|---|---|---|---|---|---|---|---|---|---|---|---|
| P | Allocation | a==>0 | b==>1 | | c==>2 | d==>3 | | | e==>1 | | | |
| Q<br>LRU=><br>R | 0/w | 1/x | 2/y | 2/y | 3/z | 1/b | 0/a | 1/b | 0/a | 2/c | 3/d | 1/e |
| S | 1/x | 2/y | 3/z | 3/z | 1/b | 0/a | 2/c | 0/a | 2/c | 3/d | 1/e | 0/a |
| T | 2/y | 3/z | 0/a | 1/b | 0/a | 2/c | 3/d | 2c | 3/d | 1/e | 0/a | 2/c |
| U | 3/z | 0/a | 1/b | 0/a | 2/c | 3/d | 1/b | 3/d | 1/e | 0a | 2/c | 3/d |
| V | Replaced | w==> | x==> | | y==> | z==> | | | b==> | | | |

Importance level of cache line is reduced; cache line b continues to store valid data

| Sequence | 31 a | 32 b | 33 a | 34 c | 35 d | 36 b | 37 b | 38 e | 39 a | 40 c | 41 d |
|---|---|---|---|---|---|---|---|---|---|---|---|
| Allocation | a=>0 | b=>1 | | c=>2 | d=>3 | | | e=>0 | a=>2 | c=>3 | d=>1 |
| LRU=> | 1/x | 2/y | 2/y | 3/z | 1/b | | 0/a | 2/c | 3/d | 1/b | 0/e |
|  | 2/y | 3/z | 3/z | 1/b | 0/a | 0/a | 2/c | 3/d | 1/b | 0/e | 2/a |
|  | 3/z | 0/a | 1/b | 0/a | 2/c | 2/c | 3/d | 1/b | 0/e | 2/a | 3/c |
|  | 0/a | 1/b | 0/a | 2/c | 3/d | 3/d | 1/b | 0/e | 2/a | 3/c | 1/d |
| Replaced | w==> | x==> | | y==> | z==> | | | a==> | c==> | d==> | b==> |

*Figure 2*
*(Prior Art)*

| Sequence | a | b | a | c | d | b | RICL (b) | e | a | c | d |
|---|---|---|---|---|---|---|---|---|---|---|---|
| Allocation | a==>0 | b==>1 | | c==>2 | d==>3 | | | e==>1 | | | |
| | 1/x | 2/y | 2/y | 3/z | 1/b | 0/a | 1/b | 0/a | 2/c | 3/d | 1/e |
| | | 3/z | 3/z | 1/b | 0/a | 2/c | 0/a | 2/c | 3/d | 1/e | 0/a |
| | | | 1/b | 0/a | 2/c | 3/d | 2c | 3/d | 1/e | 0/a | 2/c |
| | 0/a | 1/b | 0/a | 2/c | 3/d | 1/b | 3/d | 1/e | 0a | 2/c | 3/d |
| Replaced | w==> | x==> | | y==> | z==> | | | b==> | | | |

37 38

Importance level of cache line is reduced; cache line b continues to store valid data

P, Q, R (LRU=>), S, T, U, V

*Figure 3*

METHOD FOR REDUCING AN IMPORTANCE LEVEL OF A CACHE LINE

FIELD OF THE INVENTION

The present invention relates generally to a cache associated with a computer central processor unit (CPU), and, in particular, to a method for reducing the importance level of a cache line.

RELATED TECHNOLOGY

As is known, a cache is a fast local storage memory used in computer systems. The cache is typically arranged between the CPU and the main system memory. The cache is used to hold copies of data that are frequently requested from the main system memory by the CPU. A memory system can consist of several levels of caches. The lower the level of a cache, the closer that cache level is to the CPU and the faster and smaller the cache may be.

A common measure of cache performance is the "hit rate." When the CPU requests data from the main system memory, the cache control logic checks if the information is available in the cache memory. A cache hit occurs when the information requested by the CPU is in the cache. The cache responds to a hit by passing the requested information back to the CPU. The CPU receives the data relatively fast so it can handle it with a relatively short delay.

If the data requested by the CPU is not in the cache, a "miss" occurs. The data requested must then be retrieved from the slower main system memory or from a higher level of cache. A cache may be divided into a number of "lines," or entries. A line of cache may hold data for more than one memory access. Typically, a copy of the retrieved data is saved into the cache memory in a cache line, overwriting the data currently existing in that line. Due to cost considerations, the cache memory is of limited size. Therefore, a so-called replacement policy, or algorithm, is used to determine which line of the cache memory is to be replaced when data is retrieved either from the main system memory or from a higher level of cache.

The cache-hit rate is defined to be the percentage of memory requests that were completed by accessing the cache without going to higher cache level or to the main memory. High cache-hit rate results in higher overall CPU performance.

The replacement policy used by the cache has a direct effect on the hit rate of the cache. For example, replacing data that will be needed subsequently in a given program or process results in a lower hit rate since the CPU will then later not find the needed data in the cache memory. The CPU will have to go to the (slower) main system memory to retrieve the needed data. Thus the replacement policy affects hit rate and, consequently, overall CPU performance.

A variety of replacement policies are known. For example, the least recently used (LRU) policy replaces the cache entry which was less recently used compared to other cache entries. The LRU policy is based on the theory that the least recently the data was used, the less likely the program will request it again. Another replacement policy is the random policy, which selects cache memory locations for replacement at random.

The replacement policy implemented in a given cache is typically fixed in the cache hardware. The application programmer writing software to run on the CPU associated with the cache has no way to provide an indication to the cache that a given line of cache is a good candidate for replacement independent of the particular replacement policy in effect.

SUMMARY OF THE INVENTION

The present invention provides a method for reducing an importance level of a line in a memory of a cache, the method comprising providing an instruction to the cache indicating that the line is a candidate for replacement.

BRIEF DESCRIPTION OF THE DRAWINGS

FIG. 2 shows a table demonstrating prior art cache line replacement for a cache set and memory access sequence for an LRU replacement policy; and FIG. 3 shows a table demonstrating cache line replacement when a method for reducing an importance level of a cache line according to an embodiment of the present invention is applied to the cache set, memory access sequence, and LRU replacement policy of FIG. 2.

DETAILED DESCRIPTION

Figure 1:
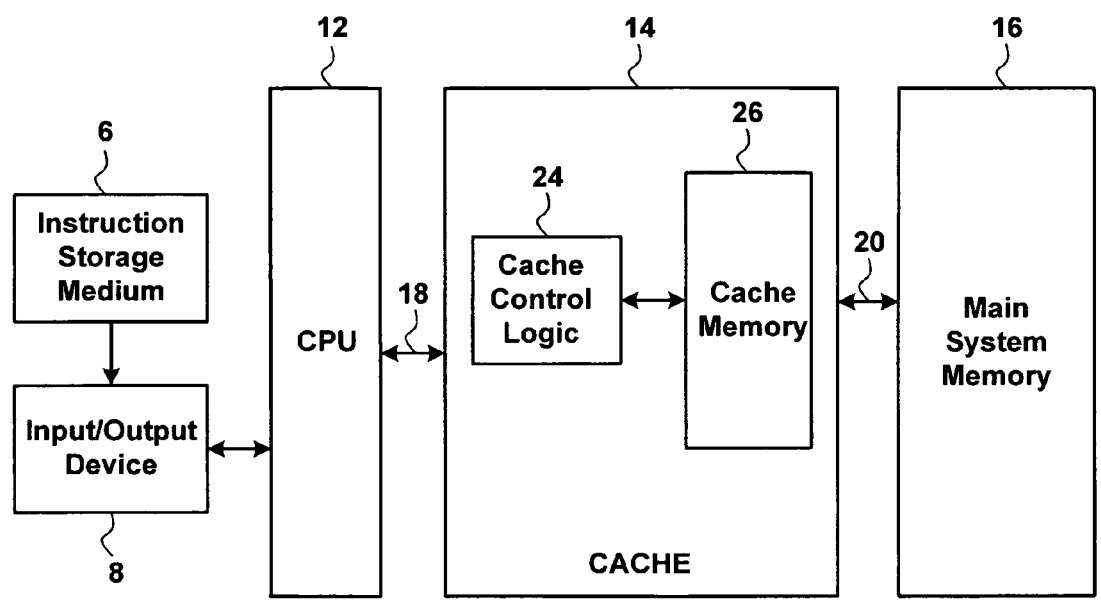
FIG. 1 shows a schematic diagram of a cache associated with a main system memory and a CPU according to an embodiment of the present invention.

Referring to FIG. 1, cache 14 is connected to CPU 12 via bus 18 and to main system memory 16 via bus 20. Instruction storage medium 6 is read by input/output device 8, which feeds instructions stored on input/output device 8 into CPU 12. Instruction storage medium 6 may be any type of suitable medium for storing instructions of a program, such as, for example, a magnetic storage disk. Input/output device 8 may be any type of suitable device such as, for example, a disk drive. CPU 12 may be any type of appropriate CPU, such as a processor or microprocessor. Main system memory 16 may be any type of appropriate storage medium, such as dynamic random access memory (DRAM), for example. Cache 14 includes cache control logic 24 and cache memory 26. Cache 14 may be any type of appropriate cache system. Cache memory 26 may be static random access memory (SRAM), for example. As embodied herein, cache memory 26 is part of a first cache level. Other, higher levels of cache memory may be provided.

An instruction according to an embodiment of the present invention, hereinafter referred to as the reduced importance cache line (RICL) instruction, may be an independent memory access instruction. Alternatively, the RICL may be a part of, or an extension of, another memory access instruction, such as, for example a 'store' instruction. The RICL is decoded by the decoder of CPU 12 and sent to a memory control unit (MCU) associated with the CPU with an address which is the parameter of the instruction. The MCU then executes the instruction.

As embodied herein, each location in main system memory 16 can map to only a subset of the total number of cache entries, or lines. Each of these subsets is collectively known as a "set." Control bits associated with a cache set indicate which entry of the set will be allocated for this memory data, replacing a copy of data already in that cache line. As embodied herein, a fixed heuristic function is used as a replacement policy to set the value of the control bits according to the history of memory requests. There is, as is typical, no way to directly control those bits using software.

Reference may now be had to FIGS. 2 and 3 to demonstrate how an RICL instruction according to an embodiment of the present invention may be used to decrease the number of memory requests from CPU 12 completed by accessing cache 14 without going to a higher cache level or to main system memory 16, and thereby increase cache hit rate.

FIG. 2 shows a table demonstrating a prior art cache line replacement for a cache set and memory access sequence using an LRU replacement policy. A sequence of eleven memory accesses {a, b, a, c, d, b, b, e, a, c, d} are mapped to the same four-line cache set {0, 1, 2, 3}. Each of {a, b, a, c, d, b, b, e, a, c, d} indicate a main memory location being accessed by the CPU. It is assumed that the cache set {0, 1, 2, 3} initially contains copies of data for locations w, x, y and z, respectively, i.e., cache line 0 corresponds to memory location w, cache line 1 corresponds to memory location x, cache line 2 corresponds to memory location y and cache line 3 corresponds to memory location z.

Columns 30–41 in FIG. 2 represent:

in row P, the sequence of eleven memory accesses, sequentially from left to right;

in row Q, the allocation of the memory access retrievals when the memory access required access to the main system memory, i.e., in which cache line of cache set {0, 1, 2, 3} the retrieved data is saved;

in rows R, S, T, U, the ranking of the cache lines of cache set {0, 1, 2, 3} based on the control bits according to the LRU replacement policy, row R indicating the least recently used cache line, row S indicating the next least recently used cache line and row U indicating the "most" recently used cache line of the set, i.e., least recently used increasing from bottom to top; and in row V, the main memory location for which data was replaced under the least recently used replacement policy.

Initially, cache set {0, 1, 2, 3} contains copies of data for locations w, x, y and z, respectively, and the LRU replacement policy ranking is cache lines 0, 1, 2, 3 (see column 30). Upon the first memory access, for main system memory location a (row P, column 31), the data for location w in cache line 0 is replaced with a copy of the data from main system memory location a, since cache line 0 is the least recently used cache line, as indicated by the 0 in row R, column 30. The replacement of data for location w is indicated by the w in row V, column 31. According the LRU replacement policy, cache line 1 then becomes the least recently used cache line, as indicated by the 1 (column 31) taking the place of 0 in row R. Similarly, upon the second memory access, for main system memory location b (row P, column 32), cache line 1 is replaced with a copy of the data from main system memory location b, since cache line 1 is the least recently used cache line, as indicated, as noted above, by the 1 in row R of column 31. The data for location x is thereby replaced, as indicated in row V, column 32.

Upon the third memory access, for main system memory location a (row P, column 33), the data for location a is already present in cache line 0, so no access of the main system memory, and hence no replacement of a cache line, is necessary.

In the complete access sequence depicted in FIG. 2, it is apparent from row V that a total of eight cache entry replacements are necessary (w, x, z, y, a, b, c, d).

Referring now to FIG. 3, a table similar to that shown in FIG. 2 is presented. FIG. 3 depicts the same memory access sequence, with the same LRU policy, as that shown in FIG. 2. In this case, however, an RICL instruction according to an embodiment of the present invention is implemented together with the seventh memory access (row P, column 37). The RICL instruction here has the effect of moving the cache line (1) containing a copy of the data for main memory location b to the top of the LRU ranking (row R, column 37).

Thus, in the eighth memory access (row P, column 38), the data for b in cache line 1 is replaced (see row V, column 38) instead of the data for a in cache line 0, as with the "pure" LRU replacement policy, as shown in FIG. 2 (see row V, column 38 of FIG. 2).

The RICL instruction might be used as shown in FIG. 3 because the data for main system memory location b will not be used as soon as other data, such as location a, by an application running on the CPU. As a result of location b, rather than location a, data being replaced (see row V, column 38 of FIGS. 2 and 3), fewer total cache line replacements, i.e., cache misses, occur. Implementation of the RICL instruction according to an embodiment of the present invention has the advantageous affect in this example of reducing the number of cache entry replacements from eight to five. The result is a higher hit rate and, consequently, improved performance of CPU 12.

An RICL instruction according to an embodiment of the present invention may advantageously be implemented in an application kernel running on CPU 12. For example, CPU performance for a matrix multiplication function could be improved using the RICL instruction. Shown below are two code sequence loops for a matrix multiplication C=A×B, where each line of A is multiplied by all line of B to form the first line of C, then next line of A is multiplied by all lines of B to form the second line of C, etc. Code Sequence I is a basic matrix multiplication loop, while Code Sequence II is the same matrix multiplication loop with use of the RICL instruction.

Code Sequence I

```
For (int i = 0; i < SIZE; i++){
    For (int j = 0; j < SIZE; j++){
        For (int k = 0; k < SIZE; k++){
            // C[i][j] += A[i][k]*B[k][j];
            Load r1 ← A[i][k];
            Load r2 ← B[k][j];
            R3 ← r1 * r2;
            Load r4 ← C[i][j];
            R3 ← r3 + r4;
            Store C[I][j] ← r3
        }
    }
}
```

Code Sequence II

```
For (int i = 0; < SIZE; i++){
    For (int j = 0; j < SIZE-i; j++){
        For (int k = 0; k < SIZE; k++){
            // C[i][j] += A[i][k]*B[k][j];
            Load r1 ← A[i][k];
            Load r2 ← B[k][j];
            R3 ← r1 * r2;
            Load r4 ← C[i][j];
            R3 ← r3 + r4;
            Store.RICL C[I][j] ← r3
        }
    }
    // Assume: j = SIZE - 1
    For (int k = 0; k < SIZE; k++){
        // C[i][j] += A[i][k]*B[k][j];
        Load.RICL r1 ← A[i][k];
        Load r2 ← B[k][j];
        R3 ← r1 * r2;
        Load r4 ← C[i][j];
        R3 ← r3 + r4;
        Store.RICL C[I][j] ← r3
    }
}
```

In Code Sequence II, the RICL instruction, or indication, is asserted for every A line the last time it is used. Lowering the importance of used A and C cells, frees space for more B cells in the cache, decreasing the number of main system memory accesses and thereby increasing the cache hit rate.

Thus, an instruction according to the present invention provides information to the cache about an unneeded cache line. A parameter of the instruction is a memory address. The cache associates the memory address with a cache line if it exists in the cache. The instruction indicates that the memory address will not be used in the near future. Therefore, the importance of the cache line, if any, holding this memory address can be reduced. The information provided by the instruction does not affect the semantics of an application program being run on the CPU associated with the cache, but will provide a useful hint to the cache so as to increase hit rate and, thereby, CPU performance. The instruction will not cause exceptions in the CPU operations.

Execution of the instruction may result in a change in the cache control bits that track memory requests from the CPU so as to optimize the allocation of cache lines. As noted above, a memory access may be smaller than the size of a cache line. The cache control logic may reduce the importance of a cache line based on the first indication to any byte of a cache line, after indication to the entire cache line, or after any number of the bytes in the cache line are indicated to be less important. Alternatively, the cache control logic may ignore an indication provided by the instruction entirely. Additionally, the indication provided by the instruction can propagate to higher levels of cache.

An instruction according to the present invention may be advantageously used in application kernels. As is known, application kernel is a small portion of software that consumes a large number of cycles of the CPU in a typical usage of the application. Because kernels are typically hand written in assembler language, the developer has the knowledge about the application and the ability to schedule instructions, such as an RICL instruction according to the present invention. An RICL instruction according to the present invention could also be applied in compilers, especially feedback driven compilers, or other interpreter of a higher-level language.

An instruction according to the present invention may reside on any suitable instruction storage medium, such as, for example, a magnetic storage disk, as would be understood by one of skill in the art.

Variations may be made in specific implementations that are within the scope of the present invention. For example, a method according to the present invention may be an addition of a hint bit to an existing memory access instruction. The bit indicates that this access is the "last" access, for now, to this memory location and the corresponding cache entry is a good candidate for replacement. It should also be emphasized that, although an LRU replacement policy was described herein, a method according to the present invention may be applied with any suitable replacement policy and/or cache allocation methodology. An instruction according to the present invention provides an indication that a cache line is a candidate for replacement. The cache control logic may use the instruction to alter the cache allocation methodology in other ways besides mere replacement of a cache line, as would be understood by those of skill in the art.

What is claimed is:

1. A method comprising:
   (a) providing an instruction to access valid data in a cache;
   (b) indicating that a line storing the valid data in the cache is a candidate for replacement by reducing an importance level of the line after the valid data is accessed; and
   (c) while maintaining the line as a valid line.

2. The method as recited in claim 1 further comprising:
   reducing an importance level of the line based on the instruction.

3. The method as recited in claim 2 wherein the reducing of the importance level of the line results in the line being replaced prior to an other line scheduled for replacement by a replacement policy of the cache.

4. The method as recited in claim 3 wherein the replacement policy is a least recently used policy and wherein said other line is less recently used than the line.

5. The method as recited in claim 1 further comprising:
   altering an allocation methodology of the cache based on the instruction.

6. The method as recited in claim 1 wherein the instruction is part of an application kernel.

7. The method as recited in claim 1 wherein the instruction is generated by a compiler.

8. The method as recited in claim 1 wherein the instruction is an extension of a memory access instruction.

9. A machine-readable medium having stored thereon an instruction to perform a method comprising:
   accessing a valid data memory component and indicating that a line storing valid data in a memory of a cache is a candidate for replacement by reducing an importance level of the line while maintaining the line as a valid line.

10. The machine-readable medium as recited in claim 9 wherein the reducing of the importance level of the line results in the line being replaced prior to an other line scheduled for replacement by a replacement policy of the cache.

11. The machine-readable medium as recited in claim 10 wherein the replacement policy is a least recently used policy and wherein said other line is less recently used than the line.

12. The machine-readable medium as recited in claim 9 further comprising:
    altering an allocation methodology of the cache based on the instruction.

13. The machine-readable medium as recited in claim 9 wherein the instruction in part of an application kernel.

14. The machine-readable medium as recited in claim 9 wherein the instruction is generated by a compiler.

15. The machine-readable medium as recited in claim 9 wherein the instruction is an extension of a memory access instruction.

16. A machine-readable medium having stored thereon a plurality of executable instructions to perform a method comprising:
    providing an instruction to access valid data in a cache and to indicate that a line storing the valid data in the cache is a candidate for replacement by reducing an importance level of the line after the valid data is accessed while maintaining the line as a valid line.

17. The machine-readable medium as recited in claim 16 wherein the method further comprises:
    reducing an importance level of the line based on the indication.

18. The machine-readable medium as recited in claim 17 wherein the reducing of the importance level of the line results in the line being replaced prior to an other line scheduled for replacement by a replacement policy of the cache.

19. The machine-readable medium as recited in claim 18 wherein the replacement policy is a least recently used policy and wherein said other line is less recently used than the line.

20. The machine-readable medium as recited in claim 16 the method further comprises:
    altering an allocation methodology of the cache based on the indication.

21. The machine-readable medium as recited in claim 16 wherein the indication is part of an application kernel.

22. The machine-readable as recited in claim 16 wherein the indication is generated by a compiler.

23. The machine-readable medium as recited in claim 16 wherein the indication is an extension of a memory access instruction.

24. A cache comprising:
    a cache memory including a cache line storing valid data; and
    a cache control logic to receive an instruction to access the valid data and an indication to reduce an importance level of the cache line based on the instruction while maintaining the cache line as a valid cache line.

25. The cache as recited in claim 24 wherein the instruction provides an indication that the cache line is a candidate for replacement.

26. The cache as recited in claim 25 wherein the cache control logic reduces an importance level of the cache line based on the indication.

27. The cache as recited in claim 26 wherein the reducing of the importance level of the cache line results in the cache line being replaced prior to another cache line scheduled for replacement by a replacement policy of the cache.

28. The cache as recited in claim 24 further comprising altering an allocation methodology of the cache based on the instruction.

29. A method for controlling a cache comprising:
    (a) providing an instruction to access valid data in the cache;
    (b) indicating that a line storing the valid data is a candidate for replacement by reducing an importance level of the line; and
    reducing an importance level of the line based on the instruction after the valid data is accessed;
    (c) while maintaining the line as a valid line.

30. The method as recited in claim 29 wherein the reducing of the importance level of the line results in the line being replaced prior to an other line scheduled for replacement by a replacement policy of the cache.

31. The method as recited in claim 30 wherein the replacement policy is a least recently used policy and wherein said other line is less recently used than the line.

32. The method as recited in claim 29 further comprising:
    altering an allocation methodology of the cache based on the instruction.

33. The method as recited in claim 29 wherein the instruction is part of an application kernel.

34. The method as recited in claim 29 wherein the instruction is generated by a compiler.

35. A processor comprising:
    a decoder to receive a reduced importance cache line instruction to cause said processor to
        access a valid data memory component, and
        indicate that a line storing valid data in a memory of a cache is a candidate for replacement by reducing an importance level of the line while maintaining the line as a valid line.

36. The processor of claim 35 wherein the reducing of the importance level of the line results in the line being replaced prior to an other line scheduled for replacement by a replacement policy of the cache.

37. The processor of claim 35 wherein the replacement policy is a least recently used policy and said other line is less recently used than the line.

38. The processor of claim 35 wherein said reduced importance cache line instruction is further to cause said processor to:
    alter an allocation methodology of the cache based on the instruction.

* * * * *